3,057,820
STABILIZED UNCURED COPOLYMERS OF BUTADIENE AND STYRENE

Richard W. Bell, Ernest Csendes, and Herbert F. McShane, Jr., Wilmington, Del., assignors to E. I. du Pont de Nemours and Company, Wilmington, Del., a corporation of Delaware
No Drawing. Filed June 9, 1959, Ser. No. 819,012
1 Claim. (Cl. 260—45.85)

This invention is directed to a new composition of matter, an SBR rubber protected against gel formation during mechanical shearing at elevated temperatures.

SBR is a synthetic rubber which is a copolymer of butadiene and styrene and has become an increasingly important article of commerce in recent years. Unfortunately, the uncured product is very sensitive to heat. After it has been made by emulsion polymerization, it is isolated as wet crumbs which are dried by passage through a heated zone. Unless a stablizer is present, serious resinification may occur during this operation. It has, accordingly, been the customary practice to introduce a dispersion of a water-insoluble antioxidant into the emulsion before the crumbs are isolated. When dry, the stabilized crumb is shipped to processors in the trade.

There it is compounded and cured to give the desired elastomeric articles. While being compounded, the uncured SBR rubber stock is subjected to considerable shearing action on rollers or in Banbury mixers. This shearing action generates heat which raises the temperature of the uncured SBR rubber close to 150° C. In spite of the stabilizer present, the character of the SBR rubber then begins to change and satisfactory processing becomes steadily more difficult. Within 20 minutes at 150° C. the gel content of the SBR rubber stock may rise from 0% to a value as high as 50%. This change is reflected by an observed increase in the values of the Mooney viscosity as well as the Williams plasticity and recovery. The faster the SBR rubber is processed, the higher the processing temperature will rise and the more pronounced this gel formation will become. This gel formation is highly undesirable. It is accompanied by a temporary increase in the Mooney viscosity; this irregularity makes it very difficult to process such stock in a reproducible fashion. Equally important, when gel is present, inferior vulcanizates are obtained: they display a higher modulus, break at shorter extensions and display much less resistance to flex cracking than do the vulcanizates made from gel-free stock.

It is an object of the present invention to provide a stabilized uncured hot SBR rubber not heretofore attainable in the prior art. It is another object of this invention to provide a stabilized uncured SBR rubber composition which composition is stabilized against gel formation during mechanical shearing at elevated temperatures. It is a further object of this invention to stabilize uncured SBR rubber against gel formation during milling at temperatures above 135° C.

These and other objects will become apparent in the following description and claims.

More specifically, the present invention is directed to an uncured copolymer of 1,3-butadiene and styrene stabilized against gel formation during mechanical shearing above about 135° C. by incorporating therein (1) at least 0.75% by weight of a phenolic antioxidant, and, (2) at least 0.1% by weight of a promoter compound selected from the group consisting of (A) polyols having the structure $$HOCH_2(CHOH)_4CH_2X,$$

where $X=$ —OH, —NH(lower alkyl); (B) ammonium citrates; (C) acetate salts of N(lower alkyl)glucamines.

Ammonium citrates which may be utilized have the structure

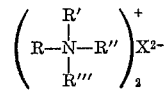

where $R=H$, an alkyl radical, a cycloalkyl radical, a hydroxyl-substituted alkyl radical, a polyhydroxy-substituted alkyl radical, an aryl radical, or an aralkyl radical; $R'$, $R''$, $R'''$ (which need not be the same) $=H$, an alkyl radical, a cyloalkyl radical, a hydroxyl-substituted alkyl radical, a polyhydroxy-substituted alkyl radical, or an aralkyl radical; with the proviso that R and $R'$ may be joined to form a polymethylene radical having 3 to 7 chain C-atoms or a 3-oxapentamethylene radical; $X=$ citrate anion. Additional operable ammonium citrates include citrate salts of the following unsaturated heterocyclic bases: pyridine; pyridine having at least one C-atom bearing an alkyl, hydroxyalkyl, polyhydroxyalkyl, alkoxy, aryloxy, or halogen radical; quinoline; quinoline having at least one C-atom bearing an alkyl, hydroxyalkyl, polyhydroxyalkyl, alkoxy, aryloxy, or halogen radical; isoquinoline; isoquinoline having at least one C-atom bearing an alkyl, hydroxyalkyl, polyhydroxyalkyl, alkoxy, aryloxy, or halogen radical.

The SBR rubber used in this invention contains about 4 to 43% styrene units by weight of the copolymer. The preferred copolymer, which incorporates about 23.5% styrene units by weight, exhibits an intrinsic viscosity in toluene of about 2.09 which corresponds to a viscosity average molecular weight of about 270,000; its transition temperature is about −62° C.; its density at 25° C. is about 0.93 g. per cc.; the Mooney viscosity of raw uncompounded polymer read after 4 minutes' operation of the large rotor at 100° C. ranges between about 46 to 54.

The antioxidant and the promoter are introduced, according to this invention, into uncured SBR before it is subjected to mechanical shearing at temperatures above 135° C. In order to prevent gel formation, it is preferred to introduce all of the promoter before the uncured SBR rubber stock reaches a temperature of 135° C. As has been pointed out heretofore, in general commercial practice it is necessary to introduce the antioxidant into SBR latex in order to protect the SBR polymer crumbs during the subsequent drying stage. However, the antioxidant may be introduced into the gel-free solid polymer itself.

Since the promoters are water-soluble compounds (or compounds wihich are quite hydrophilic), they will be lost (at least in part) if added to an aqueous latex unless special techniques are used to protect them; ordinarily, therefore, the promoters would not be added to an aqueous latex. Accordingly, the promoter is preferably introduced into the uncured SBR rubber stock at the time it is compounded (unless special techniques are employed during the isolation of the polymer crumbs from the latex). It should be noted that the copolymer crumbs receive added protection during the drying stage when the promoter is present. The promoter may be added to the latex by special techniques to accomplish this result, when desired. For example, the promoter is encapsulated in an oil-soluble material before it is added.

It is believed that any phenolic antioxidant may be used in this invention. By phenolic antioxidant is meant a phenolic compound, which, when added to elastomers in small proportions, retards atmospheric oxidation or the effect of oxidation.

Representative examples of antioxidants which may be employed are:

2,2'-methylenebis(6-tert-butyl-4-methyl phenol),
2,2'-methylenebis(6-tert-butyl-4-ethyl phenol),
2,2'-methylenebis [4-methyl-6-(1,1,3,3-tetramethyl)butyl phenol],
4,4'-bis(2-tert-butyl-5-methyl phenol)sulfide,
4,4'-butylidene-bis(2-tert-butyl-5-methyl phenol),
2,2'-methylenebis(4,6-dimethyl phenol),
2-tert-butyl-4(4-tert-butyl phenyl)phenol,
2-tert-butyl-4-phenyl phenol,
2,6-dibenzyl-4-methyl phenol,
2-benzyl-4-methyl phenol,
2-benzyl-6-tert-butyl-4-methyl phenol,
2-benzyl-6-tert-butyl-4-ethyl phenol,
2,4-dimethyl-6-(1-methyl-1-cyclohexyl) phenol,
2,6-diisopropyl-4-methyl phenol,
2,4-dimethyl-6-isopropyl phenol, 2-tert-butyl-4,6-dimethyl phenol,
2-tert-butyl-4-methyl phenol,
2-(1,1,3,3-tetramethyl butyl)-4-methyl phenol,
2,4,6-trimethyl phenol,
2,6-di-tert-butyl-4-methyl phenol,
2,6-di-tert-butyl-4-ethyl phenol,
4-phenyl phenol,
2,6-diisopropyl phenol,
2,6-di-tert-butyl-4-phenyl phenol,
2,6-di-tert-butyl-4-(4-tert-butyl-phenyl)phenol,
2,5-di-tert-butyl-hydroquinone,
2,5-di-tert-amyl-hydroquinone, and alpha-conidendrine. Mixtures of the foregoing may be used.

There appears to be no criticality in the ratio of the promoter compound to the antioxidant; however, better results are obtained when at least about 0.20 part of the promoter compound is present for each part by weight of the antioxidant. In practice, the concentrations (by weight of the SBR rubber) of the promoter and the antioxidant may range, respectively, from about 0.1 to 5% and about 0.75 to 1.75%. Less satisfactory protection is gained when lower concentrations are used; higher concentrations are less economically attractive. The preferred concentrations of the promoter and the antioxidant range, respectively, from about 0.3 to 1.5% and about 1.0 to 1.5%.

Representative examples of polyols which are operable as promoters in this invention are the following reduced sugars: sorbitol, mannitol, galactitol, talitol, iditol, allitol, altritol, and gulitol Representative examples of operable N-alkyl substituted polyols are the following glucamines: N-methyl glucamine, N-ethyl glucamine, and N-butyl glucamine. Representative examples of the citrates having the structure (RR'R''R'''N)$_2$+Y$^{2-}$ include the following operable compounds: diammonium citrate, N-ethyl glucamine monohydrogen citrate, N-butyl glucamine monohydrogen citrate, butylamine monohydrogen citrate, isooctylamine monohydrogen citrate, octadecylamine monohydrogen citrate, diethylamine monohydrogen citrate, pyrrolidine monohydrogen citrate, morpholine monohydrogen citrate, 2-diethylaminoethanol monohydrogen citrate, diethanolamine monohydrogen citrate, triethanolamine monohydrogen citrate, benzyltrimethylammonium monohydrogen citrate, dicyclohexylamine monohydrogen citrate, aniline monohydrogen citrate, N-methylaniline monohydrogen citrate, p-toluidine monohydrogen citrate, m-anisidine monohydrogen citrate and o-chloroaniline monohydrogen citrate. Representative examples of the acetates of N-(lower alkyl) glucamines are: N-methyl glucamine acetate; N-ethyl glucamine acetate; N-isobutyl glucamine acetate. Representative examples of citrates of unsaturated heterocyclic bases are: pyridine monohydrogen citrate, beta-picoline monohydrogen citrate, quinoline monohydrogen citrate, quinaldine monohydrogen citrate, isoquinoline monohydrogen citrate, and 4-methoxyisoquinoline monohydrogen citrate.

In the following representative examples there may be substituted any of the aforedesignated specific antioxidants with any of the promoter compounds identified to give essentially the same results.

A representative example illustrating the present invention follows.

The Mooney viscosities are obtained by the procedure of ASTM Method D927. A large rotor is used. The sample is sheared for 4 minutes at 212° F. (100° C.).

The gel content of the SBR is determined by a method based on the fact that the gel portion of SBR is insoluble in benzene The sample is extracted with benzene, the insoluble gel is filtered off on a 100-mesh screen, and the sol determined by evaporating an aliquot of the filtrate to dryness. The gel is determined by the difference. The apparatus utilized and procedure followed is as follows:

APPARATUS UTILIZED (1) Small-neck, screw-cap, 4-oz. brown glass bottles. The caps shall contain liners of tin, aluminum, or other material not attacked by benzene.
(2) Roller on which to roll the bottles.
(3) Pipettes (bulb type)—25 and 100 cc. capacity.
(4) Beakers—50 cc. capacity.
(5) Hot plate (steam or electric).
(6) 100° C. oven.
(7) Wire screen cylinder, closed at one end, to fit friction-tight in bottle. The screen shall be 100 mesh and made from stainless steel.
(8) Analytical balance.

PROCEDURE FOLLOWED

Weigh accurately on the analytical balance, 0.4–0.5 grams of the SBR sample, not over 0.025" thick, into a 4-oz. bottle and pipette into the bottle 100 cc. of dry thiophene-free benzene. The benzene shall be stored in a constant temperature room so that the specific gravity will remain constant from day to day.

Turn the bottle on the roller for 48±2 hours. Remove the bottle from the roller and store undisturbed in a constant temperature room until the solution temperaure reaches an equilibrium. Two hours is usually sufficient.

Leave the bottle undisturbed thereafter until any fine gel particles which may be present have settled to the bottom.

Then uncap the bottle and carefully insert the wire screen into the solution. Do not lower it in the bottle farther than necessary to draw out the aliquot sample. This will prevent undue mixing of the gel particles with the solution.

Pipette out a 25-cc. aliquot, using gentle vacuum to minimize stirring of the solution, into a 50-cc. beaker which has previously been heated for 30 minutes in the 100° C. oven, cooled in a calcium chloride desiccator, and weighed. Evaporate the solution to dryness. Care is taken not to overheat the dried polymer as it will start to discolor.

Dry the beaker to constant weight in the 100° C. oven for 30 minutes, cool in the desiccator, and weigh.

CALCULATION OF GEL $$\text{Percent gel} = \frac{\text{Wt. of sample} - 4 \times \text{wt. of residue}}{\text{Weight of sample}} \times 100$$

*Example*

A. 100 parts of SBR rubber containing 1.25 parts styrenated phenol (commercially available as Wingstay "S") is milled on a rubber roll mill maintained at 149° C. (300° F.). Samples are removed after 5, 10 and 20 minutes. Test results are given in Table 1.

B. The procedure of part A is repeated except that 1.0 part of diethanolamine monohydrogen citrate is also present in the SBR rubber.

C. The procedure of part A is repeated except that 1.0 part of sorbitol is also present in the SBR rubber.

TABLE 1.—GEL INHIBITION OF SBR CONTAINING PHENOLIC ANTIOXIDANTS

| Antioxidant | Additive | Milling Time | Mooney Viscosity | Gel Content, Percent |
|---|---|---|---|---|
| Styrenated phenol | None | 5 | 58 | 14 |
|  |  | 10 | 61 | 34 |
|  |  | 20 | 43 | 50 |
| Do | Diethanolamine monohydrogen citrate. | 5 | 53 | 0 |
|  |  | 10 | 69 | 17 |
|  |  | 20 | 74 | 44 |
| Do | Sorbitol | 5 | 48 | 0 |
|  |  | 10 | 47 | 5 |
|  |  | 20 | 40 | 24 |

A mixture of tert-butyl and tert-octyl substituted m- and p-cresols (commercially available as "Wingstay" T) is substituted for a styrenated phenol in the procedures of parts A, B and C. The results are given in Table 2.

TABLE 2

| Antioxidant | Additive | Milling Time | Mooney Viscosity | Gel Content, Percent |
|---|---|---|---|---|
| Tert-alkyl cresols | None | 5 | 51 | 1 |
|  |  | 10 | 67 | 25 |
|  |  | 20 | 43 | 51 |
| Do | Diethanolamine monohydrogen citrate. | 5 | 45 | 0 |
|  |  | 10 | 44 | 3 |
|  |  | 20 | 60 | 24 |
| Do | Sorbitol | 5 | 41 | 0 |
|  |  | 10 | 44 | 0 |
|  |  | 20 | 43 | 40 |

In the preceding example 2,6-di-tertiary-butyl-4-phenylphenol may be substituted to obtain essentially the same results.

The representative SBR rubber utilized in the preceding example contains 23.5% by weight of styrene units.

It is to be understood that any of the heretofore described promoters, antioxidants and SBR rubbers may be utilized in accordance with the preceding specific example to give substantially the same results.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows:

An uncured copolymer of 1,3-butadiene and styrene stabilized against gel formation during mechanical shearing at a temperature above about 135° C. by having incorporated therein (1) at least 0.75% by weight of said copolymer of a phenolic antioxidant, and, (2) at least 0.1%, by weight of said copolymer of a promoter compound selected from the group consisting of (a) a polyol having the structure $HOCH_2(CHOH)_4CH_2X$, wherein X is a lower alkyl —NH, (b) an ammonium citrate, and, (c) an acetate salt of an N(lower alkyl)glucamine, said alkyl group having 1 to 4 carbon atoms.

References Cited in the file of this patent

UNITED STATES PATENTS

| | | |
|---|---|---|
| 2,343,950 | Berne-Allen | Mar. 14, 1944 |
| 2,721,185 | Schulze et al. | Oct. 18, 1955 |
| 2,734,881 | Lally et al. | Feb. 14, 1956 |
| 2,999,841 | Csendes | Sept. 12, 1961 |